US 6,743,282 B2
Jun. 1, 2004

(12) United States Patent
Najm

(10) Patent No.: US 6,743,282 B2
(45) Date of Patent: *Jun. 1, 2004

(54) FURNACE FILTER SYSTEM

(76) Inventor: Joseph L. Najm, 19892 Shenandoah Ridge, Strongsville, OH (US) 44136

( * ) Notice: Subject to any disclaimer, the term of this patent is extended or adjusted under 35 U.S.C. 154(b) by 148 days.

This patent is subject to a terminal disclaimer.

(21) Appl. No.: 10/269,621

(22) Filed: Oct. 11, 2002

(65) Prior Publication Data
US 2003/0033937 A1 Feb. 20, 2003

Related U.S. Application Data

(63) Continuation of application No. 09/988,271, filed on Nov. 20, 2001, now Pat. No. 6,491,735, which is a continuation of application No. 09/504,518, filed on Feb. 15, 2000, now Pat. No. 6,402,822.

(51) Int. Cl.$^7$ .......................... B01D 46/18; B01D 46/46
(52) U.S. Cl. .............................. 96/429; 96/421; 96/423; 55/351; 55/352; 55/354; 55/422; 55/490; 55/492; 55/495; 55/500; 55/506
(58) Field of Search .................. 55/351, 352, 353, 55/354, 422, 490, 492, 495, 497, 498, 500, 501, 506; 96/421, 423, 429; 95/19, 26, 277; 242/244; 206/223; 244/916

(56) References Cited

U.S. PATENT DOCUMENTS

| 1,982,639 | A | * | 12/1934 | Cristofferson | 55/352 |
| 3,286,443 | A | | 11/1966 | Wooldridge et al. | |
| 3,337,898 | A | | 8/1967 | Schmid et al. | |
| 3,350,855 | A | | 11/1967 | Revell | |
| 3,368,333 | A | * | 2/1968 | Merklin | 55/354 |
| 3,552,098 | A | | 1/1971 | Cochran | |
| 3,552,101 | A | * | 1/1971 | Papp | 55/354 |
| 3,559,380 | A | | 2/1971 | Neumann | |
| 3,596,442 | A | | 8/1971 | Neumann | |
| 3,611,677 | A | | 10/1971 | Neumann | |
| 3,695,008 | A | | 10/1972 | Neumwnn | |
| 3,774,373 | A | * | 11/1973 | Welch et al. | 55/354 |
| 3,800,509 | A | * | 4/1974 | Carr et al. | 55/352 |
| 3,912,632 | A | * | 10/1975 | Winzen | 55/352 |

(List continued on next page.)

OTHER PUBLICATIONS

Sales brochure by AutoRolls, entitled Auto Line Automatic Air Filtration; no publication date or additional information available.

Primary Examiner—Blaine Copenheaver
Assistant Examiner—Jason M. Greene
(74) Attorney, Agent, or Firm—Fay, Sharpe, Fagan, Minnich & McKee

(57) ABSTRACT

A furnace filter system or kit for installation on an existing furnace duct having upper and lower supply roll supports respectively mountable on the top and bottom walls of the duct adjacent one side wall of the duct for removably receiving a supply roll of filter media therebetween, and upper and lower take-up roll supports respectively mounted on the top and bottom walls of the duct adjacent the other side thereof for removably receiving a filter media take-up roll therebetween. Slots are provided in the side walls of the duct inwardly adjacent the corresponding one of the supply roll and take-up roll and between the top and bottom walls of the duct, and a filter media supporting frame assembly is received in the duct and has opposite sides provided with guide slots therein aligned with the duct slots. Filter media is threaded through the supporting frame assembly from the supply roll to the take-up roll, and the latter is adapted to be periodically rotated by a motor on the upper take-up roll support to advance the filter media from the supply roll to the take-up roll. A control unit provides for the advancement of the filter media to be achieved, selectively, through one of a manual switch, timer and pressure sensor responsive to a pressure drop across the filter media in the duct.

40 Claims, 5 Drawing Sheets

U.S. PATENT DOCUMENTS

| | | |
|---|---|---|
| 4,174,205 A | 11/1979 | Koushiafes |
| 4,221,576 A * | 9/1980 | Phillips, Jr. .................. 55/352 |
| 4,359,388 A | 11/1982 | Nordenskjold |
| 4,470,833 A | 9/1984 | Wolfe |
| 4,521,230 A | 6/1985 | Strong |
| 4,894,071 A | 1/1990 | Klein |
| 4,976,749 A | 12/1990 | Adamski et al. |
| 5,217,513 A | 6/1993 | Armbruster |
| 5,411,579 A | 5/1995 | Benton et al. |
| 5,427,325 A * | 6/1995 | Weaver ....................... 242/244 |
| 5,529,593 A | 6/1996 | Simmons |
| 5,592,352 A * | 1/1997 | Vollmann ................... 360/132 |
| 5,599,363 A | 2/1997 | Percy |
| 5,912,423 A | 6/1999 | Doughty et al. |
| 6,152,998 A * | 11/2000 | Taylor ......................... 96/429 |
| 6,168,646 B1 | 1/2001 | Craig et al. |
| 6,402,822 B1 | 6/2002 | Najm |
| 6,491,735 B2 * | 12/2002 | Najm .......................... 55/492 |

* cited by examiner

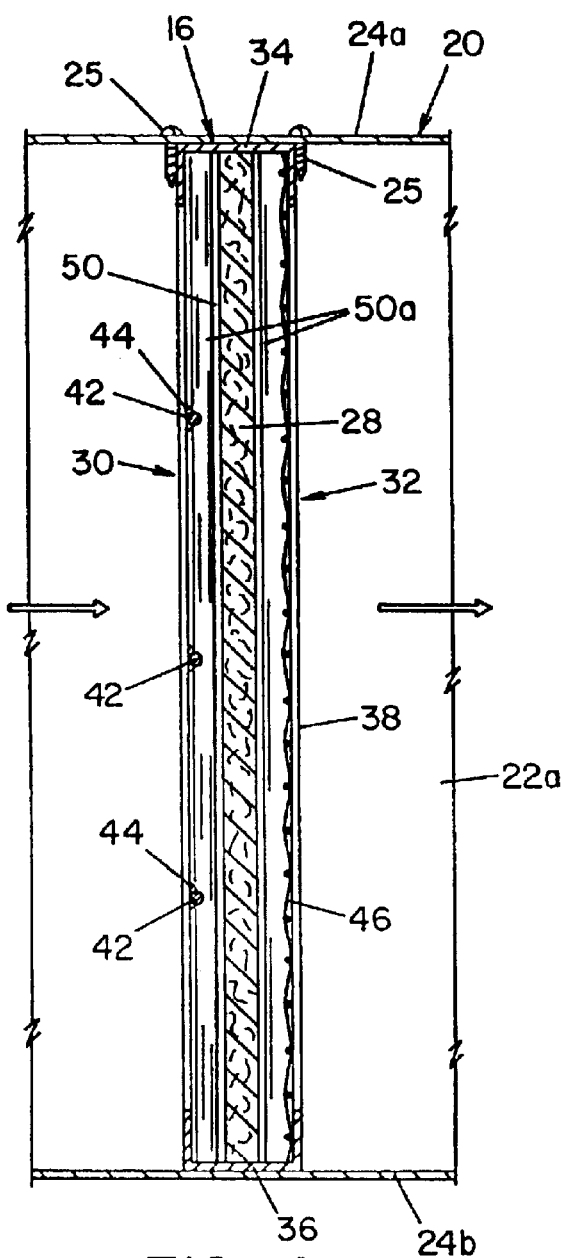
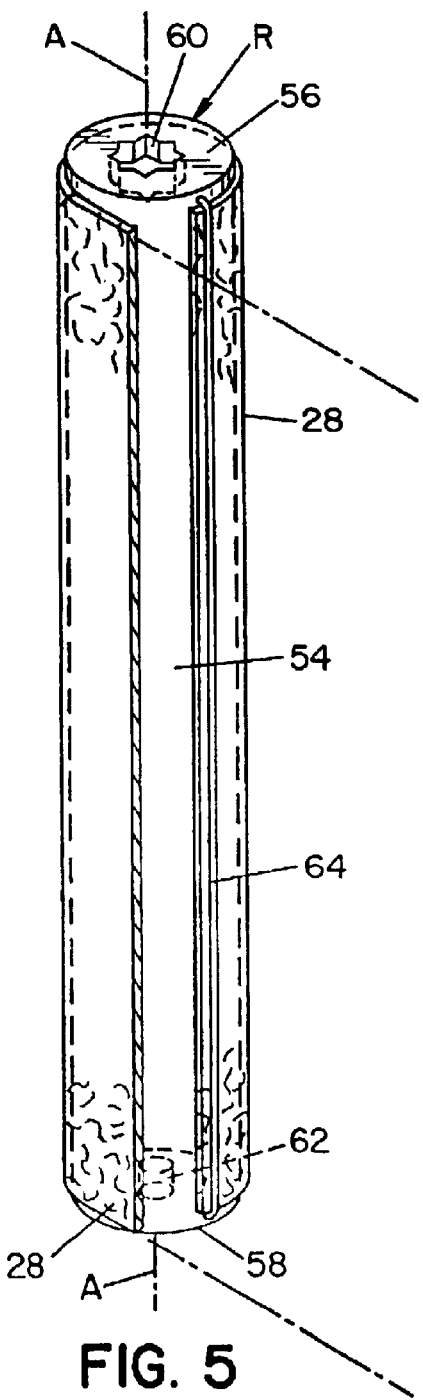
FIG. 4
FIG. 5

FURNACE FILTER SYSTEM

This patent application is a continuation of application Ser. No. 09/988,271 filed on Nov. 20, 2001, now U.S. Pat. No. 6,491,735 which in turn is a continuation of application Ser. No. 09/504,518 filed on Feb. 15, 2000, now U.S. Pat. No. 6,402,822. This invention related to the art of furnace filters, and more particularly to filter assemblies utilizing bulk filter media instead of individual replacement filters.

BACKGROUND OF THE INVENTION

This invention relates to the art of furnace filters, and more particularly to filter assemblies utilizing bulk filter media instead of individual replacement filters.

Filters of one type or another are installed on commercial and residential furnaces all over the country. Many of these furnaces employ a traditional replacement filter consisting of a rectangular sheet of filter media encased in a cardboard frame which provides support to the filter media. This type of filter is generally housed in a filter support structure which is built into the air intake of the furnace. The filter normally covers the entire opening of the air intake, giving the traditional replacement filters substantial size in both length and width. To replace such a filter, the old filter must first be manually removed and disposed of, and then a replacement filter can be inserted into the filter support structure. Since the function of these filters is to trap dirt and other particulate material, thereby removing the contaminants from the air, these filters naturally become clogged with dust and dirt. At this point, the filter becomes ineffective as it no longer has the ability to remove a significant amount of dirt and dust particles from the air. The filter also becomes inefficient as the dirt in the filter reduces the filter's ability to pass air. This requires the furnace motor to work harder to get the necessary amount of air through the furnace. Only by frequent replacement of the filter does the air continue to be efficiently and effectively cleaned.

There are inconveniences associated with such frequent replacement of these filters. First, since the dirty replacement filters must be manually removed and disposed of, the person servicing the furnace is required to physically handle the dirty filters. The filters must be handled carefully to avoid shaking the dust and dirt out of the filter and into the furnace or the surrounding area. This is made more difficult due to the size of the filter. These filters are typically not heavy, but often require two hands to handle carefully. Second, to ensure effectiveness and efficiency, the traditional replacement filter must be continually monitored to determine when the filter should be changed. Unfortunately, there is no reliable indicator to suggest when the filter needs to be replaced. So the filters are not necessarily replaced at the optimum time, instead being thrown out with useable life remaining or, worse, being used while inefficient and ineffective. Third, replacement filters of the foregoing character only provide primary filtration at the furnace intake. Once the air is forced through the furnace and into the duct work, the filter at the intake can provide no further filtration. In many situations, additional or supplemental filtration may be desired. However, the traditional type of replacement filter discussed above does not function in such a manner. Finally, the size of the traditional replacement filter, as discussed earlier, presents another inconvenient aspect of this type of filter. To be able to replace the filters as often as is necessary and to avoid making frequent trips to the hardware store to purchase a single filter, these traditional replacement filters are often purchased in quantity. However, due to their size, a quantity of these filters takes up a significant amount of valuable and often limited storage space.

U.S. Pat. No. 4,174,205 to Koushiafes, the disclosure of which is incorporated herein by reference for background purposes, discloses a furnace air filter unit which includes a structure for supporting a bulk roll of filter material. The filter unit is supported in a furnace in the manner of the traditional filters discussed above, and the filter material can be manually pulled through the support structure so that a new segment replaces the dirty filter media. The manual indexing of the filter media would occur with the same frequency as discussed above with replaceable filter inserts and the dirty portion of the media is manually separated from the fresh filter media and disposed of. A serrated knife edge is used to cut the dirty filter material from the fresh segment. In all, the service person manually feeds the dirty filter media out of the support structure and then grasps the dirty filter material by hand, manually tears the material using the knife edge, and discards the dirty segment.

The Koushiafes' filter unit may in part resolve the storage issue discussed above, but does not resolve the first three problems presented. In fact, the arrangement disclosed in Koushiafes may aggravate the problem associated with handling the dirty filter. In this respect, Koushiafes still requires the handling of dirty filter media, and also requires that the unsupported filter media be cut using a serrated edge. This will cause much of the dust and dirt from the filter media to shake loose and contaminate the area around the furnace intake. Furthermore, Koushiafes does not solve the issue of determining when to advance the filter media. Accordingly, the filter media may be discarded before being fully used, or it may be discarded after becoming inefficient and ineffective.

U.S. Pat. No. 5,599,363 to Percy, the disclosure of which is incorporated herein by reference for background purposes, discloses a vacuum filter belt apparatus such as for the air intake of a truck. The Percy apparatus is built as a complete structural unit, including permanent filter pad units, and while the unit includes a storage canister and a take-up canister the latter are mounted directly onto the body of the apparatus. A pressure responsive drive motor control provides for advancing the filter belt when it becomes dirty, and a belt depletion signal is provided. However, the unitary construction precludes the selection and separate mounting of the canisters and filter media support, respectively on, and in a furnace duct.

SUMMARY OF THE INVENTION

The present invention provides a furnace filter system having distinct advantages and improvements over the traditional furnace filter and the other prior art discussed above. As further explained in the following discussion, the present invention resolves or minimizes the shortcomings of traditional furnace filters in that it provides selectivity with respect to the location of mounting, selectivity with respect to orientation of the component parts relative to one another and a furnace duct, and ease and simplicity with respect to the installation thereof. Once mounted, the filter system minimizes the handling of dirty filters, eliminates the need for constantly monitoring the filter media's effectiveness and efficiency, adds versatility with respect to controlling usage of the filter media, makes the storage space ordinarily required to store a quantity of individual replacement filters available for other purposes, and provides the ability for adding secondary or supplemental filtration to an existing filter system.

More particularly with regard to the foregoing attributes, a furnace filter system according to the invention includes individual structural components selectively mountable on a furnace duct to provide a supply roll of filter media on one side of a furnace duct for feeding filter media across the duct to the opposite side, where the used filter media is coiled and stored on a take-up roll mounted on the other side. When the entire supply roll is exhausted and wound onto the take-up roll, the latter is disposed of. A furnace filter system according to the invention also has the ability to selectively control displacement of the media from the storage roll to the take-up roll. In this regard the system can monitor the effectivity of the section of filter media extending across the duct and, upon reaching a pre-set level of ineffectiveness, the furnace filter system will index the filter media so that a new segment of filter media is extended across the duct. As the new filter media is advanced, the dirty portion is coiled and stored. Alternatively, the system can operate to advance the filter media based on lapsed time, or can be manually controlled. This is advantageous in that there may be situations where indexing over a time duration or on an as needed basis may more closely meet the requirements of the application and allow for a more efficient use of the filter media. Additionally, the furnace filter system preferably monitors the amount of filter media remaining in the supply and issues an alarm when a preselected amount of filter media remains. The number of times the furnace filter system can be indexed is only limited by the amount of bulk filter material on a supply roll. Therefore, the equivalent number of traditional filters the furnace filter system displaces is equal to the number of times the bulk roll can be indexed. Since the bulk roll only needs to be replaced once instead of the number of times traditional replacement filters would require, the furnace filter system results in significantly reduced maintenance and handling of dirty filter material.

Unlike the traditional furnace filter which is limited to mounting at the intake of the furnace, a furnace filter system according to the invention is suitable for installation at any number of different locations in a heating and ventilation system. Moreover, the system can be easily installed by a homeowner, or do-it-your-selfer, and accordingly is readily adapted to be provided in kit form for the latter purpose. The ease of installation is due to the simple and compact design of the system components, and the fact that the components can be mounted on a furnace duct with only a minor modification thereof. In this respect, the system includes a frame assembly designed to fit within the duct, and installation of the frame assembly only requires cutting slots in opposite sides of a duct to provide enough space to maneuver the frame into one of the slots. The supply roll assembly and the take-up roll assembly are independent of the frame and can be readily mounted along opposite sides of the duct adjacent the corresponding frame slot. The only mounting requirement is that the axes of the supply and take-up rolls be generally parallel to the front and sides of the frame assembly to optimize support and guidance of the filter media therebetween. The compact design and flexible mounting options also facilitate installation of the system in areas of limited clearance, such as a crawl space, and automatic advancement of the filter media advantageously minimizes the need to enter such areas of limited accessibility to monitor and replace the filter media.

While the advantages of having a second filter in a ventilation system are well known, a filter system according to the present invention can also provide different levels of secondary filtration. That is, the filter system can utilize any one of a variety of types of filter media or combinations of filter media, thus optimizing the efficiency and effectiveness of the filtration. For example, a first filter system can be installed at the furnace intake with a roll of more coarse filter media for primary filtration, and/or another system can be installed downstream of the furnace with a roll of less coarse filter media for secondary filtration. Furthermore, the latter may be installed for use with a traditional filter at the intake. In either case the filter system will provide efficient and effective fluid filtration and is economical and convenient to operate and maintain.

It is accordingly an outstanding object of the present invention to provide a residential furnace filter system which minimizes the monitoring and maintenance required with respect to such systems heretofore available by utilizing bulk filter media which can be automatically advanced from a supply roll to a take-up roll in response to a given parameter to promote effective and efficient filtration and use of filter media.

Another object is to provide a furnace filter system of the foregoing character which is comprised of a minimum number of component parts and has a compact design and flexible mounting capabilities, thus making the system relatively simple to install and, therefore, adaptable for availability in kit form for installation on a furnace duct without disassembling the duct and with minimal modification of the duct structure.

Still another object is to provide a furnace filter system of the foregoing character which is structurally simple, thereby promoting the economic production of the system, and which facilitates easy insertion and removal of bulk filter media, without the need for tools, and with minimal handling of the bulk filter media.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 4 is a sectional elevation view of the frame assembly and duct taken along line 4—4 in FIG. 1;

FIG. 5 is a perspective view of a filter media roll of the filter system;

DESCRIPTION OF A PREFERRED EMBODIMENT

Figure 1:
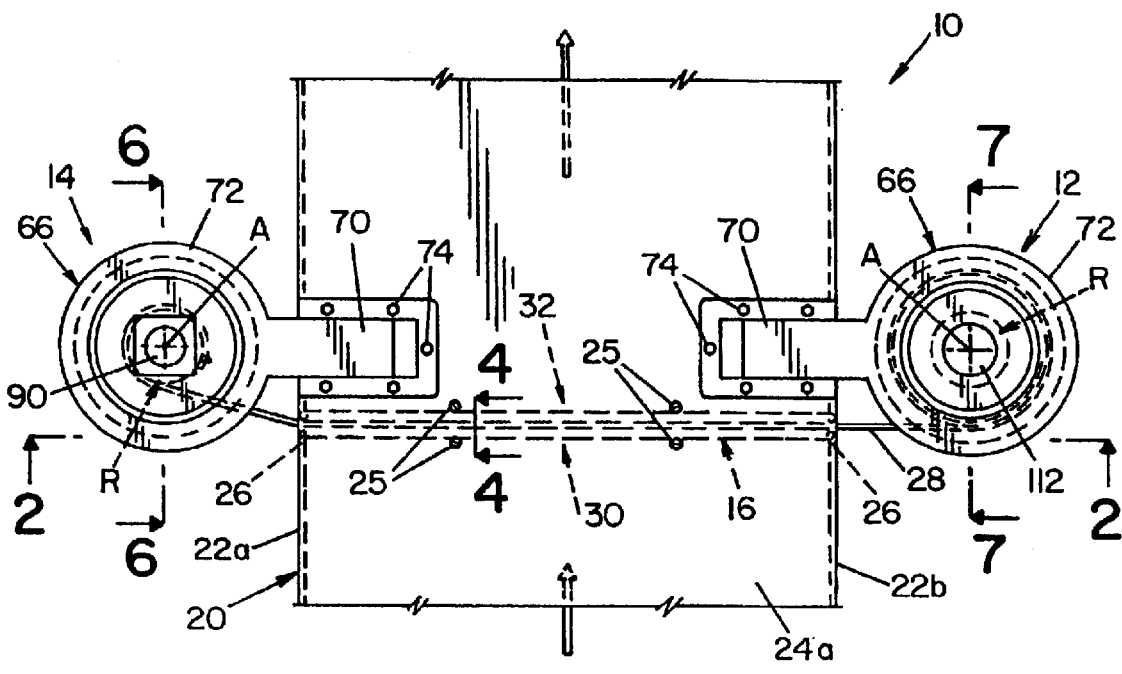
FIG. 1 is a plan view of a furnace filter system in accordance with the present invention installed on a section of furnace duct.

Referring now in greater detail to the drawings, wherein the showings are for the purpose of illustrating a preferred embodiment of the invention only, and not for the purpose of limiting the invention, FIGS. 1–8 illustrate a furnace filter system 10 installed on a section of furnace duct 20 for removing particulates from the fluid flowing through the duct 20. The furnace filter system 10 is comprised of a filter media supply assembly 12, a filter media take-up assembly 14, a frame assembly 16, and a control system 18. The furnace duct is comprised of a pair of parallel, opposing side walls 22a and 22b and top and bottom walls 24a and 24b, respectively, forming a generally rectangular cross-section. In each of the side walls 22a and 22b there is a duct slot 26 which is cut therein for receiving frame assembly 16 which supports filter media 28 as set forth hereinafter. Preferably, duct slots 26 are positioned directly opposite each other, and frame assembly 16 extends transversely across the interior of duct 20, rests on bottom wall 24b and is stabilized at top wall 24a such as by sheet metal screws 25 on the upstream and downstream sides thereon. The supply assembly 12 is mounted to be outwardly adjacent duct wall 22b and laterally adjacent slot 26 therein and includes a roll R for supporting a bulk supply of filter media 28. Similarly, take-up assembly 14 is mounted to be outwardly adjacent duct wall 22a and laterally adjacent slot 26 therein and includes a roll R for receiving dirty or spent filter media 28. Frame assembly 16, as will become apparent hereinafter guides and supports filter media 28 across the furnace duct 20. As will likewise become apparent hereinafter, control system 18 is selectively operable to control the advancement of the filter media across duct 20.

Figure 3:
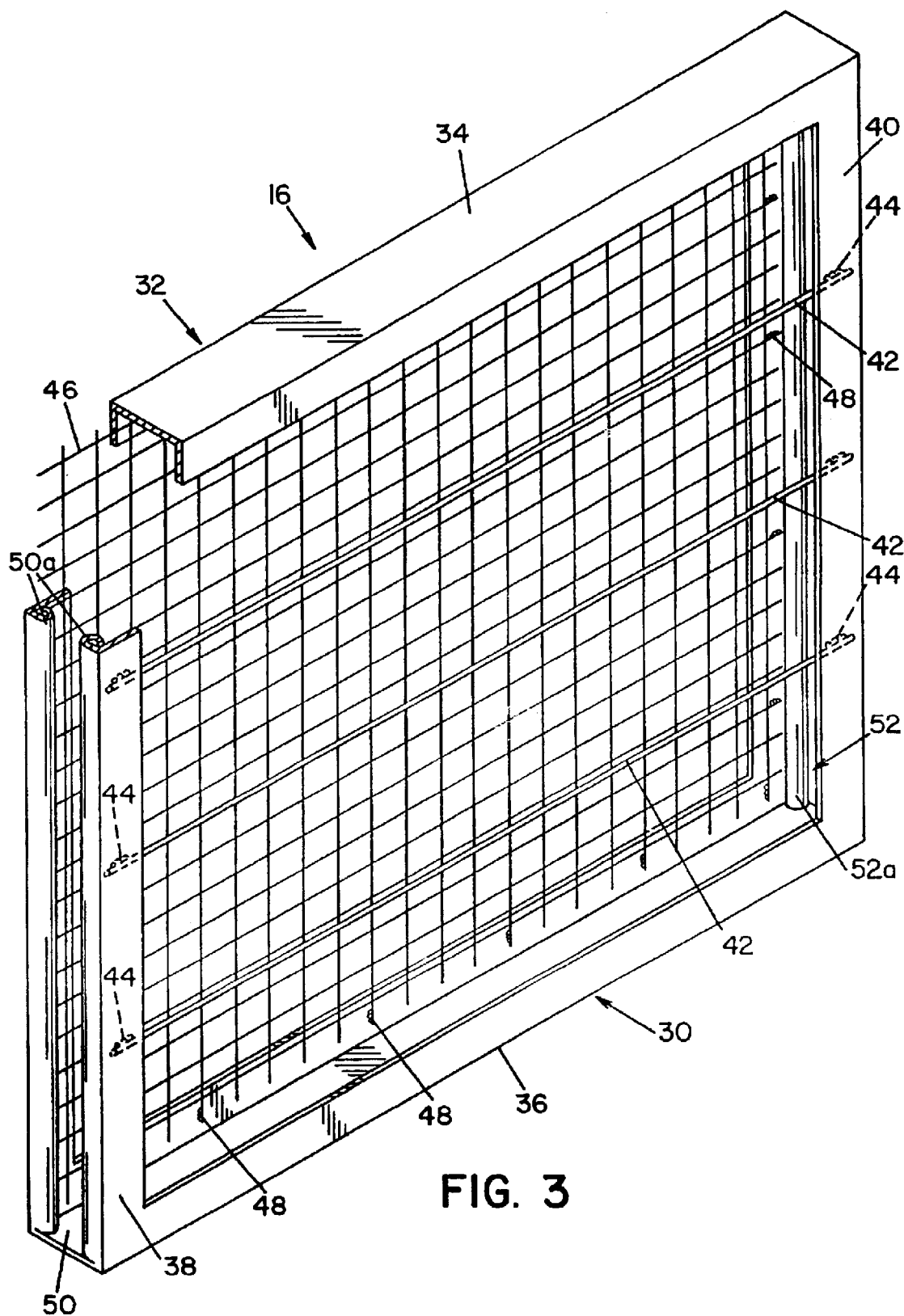
FIG. 3 is a perspective view of the frame assembly of the filter system.

As best seen in FIGS. 3 and 4, frame assembly 16, has front and rear sides 30 and 32, respectively, and is comprised of top and bottom frame members 34 and 36, respectively, and a pair of spaced apart side members 38 and 40 therebetween. The frame assembly is oriented within duct 20 such that front side 30 is facing upstream, back side 32 is facing downstream and the side members 38 and 40 are aligned with duct slots 26. The frame members are channel shaped in cross section, and the front and rear flanges thereof are provided with support components for supporting the portion of the filter media extending through the frame inside of duct 20. More particularly in this respect, a plurality of vertically spaced apart guide wires 42 extend horizontally across the front of the frame assembly and have their opposite ends attached to the insides of the front flanges of side members 38 and 40, such as by weldments 44, and a filter support screen 46 extends across the back of the frame assembly and has edge portions attached to the insides of the rear flanges of the frame members, such as by weldments 48. The webs of side members 38 and 40 are vertically cut and rolled inwardly to provide slots 50 and 52 therein, respectively, and which extend along the lengths thereof to provide access to the cavity formed between the front and back support components of the frame assembly. The frame slots 50 and 52 respectively include rounded edges 50a and 52a which prevent the tearing of filter media 28 as it enters and exits frame assembly 16.

Figure 6:
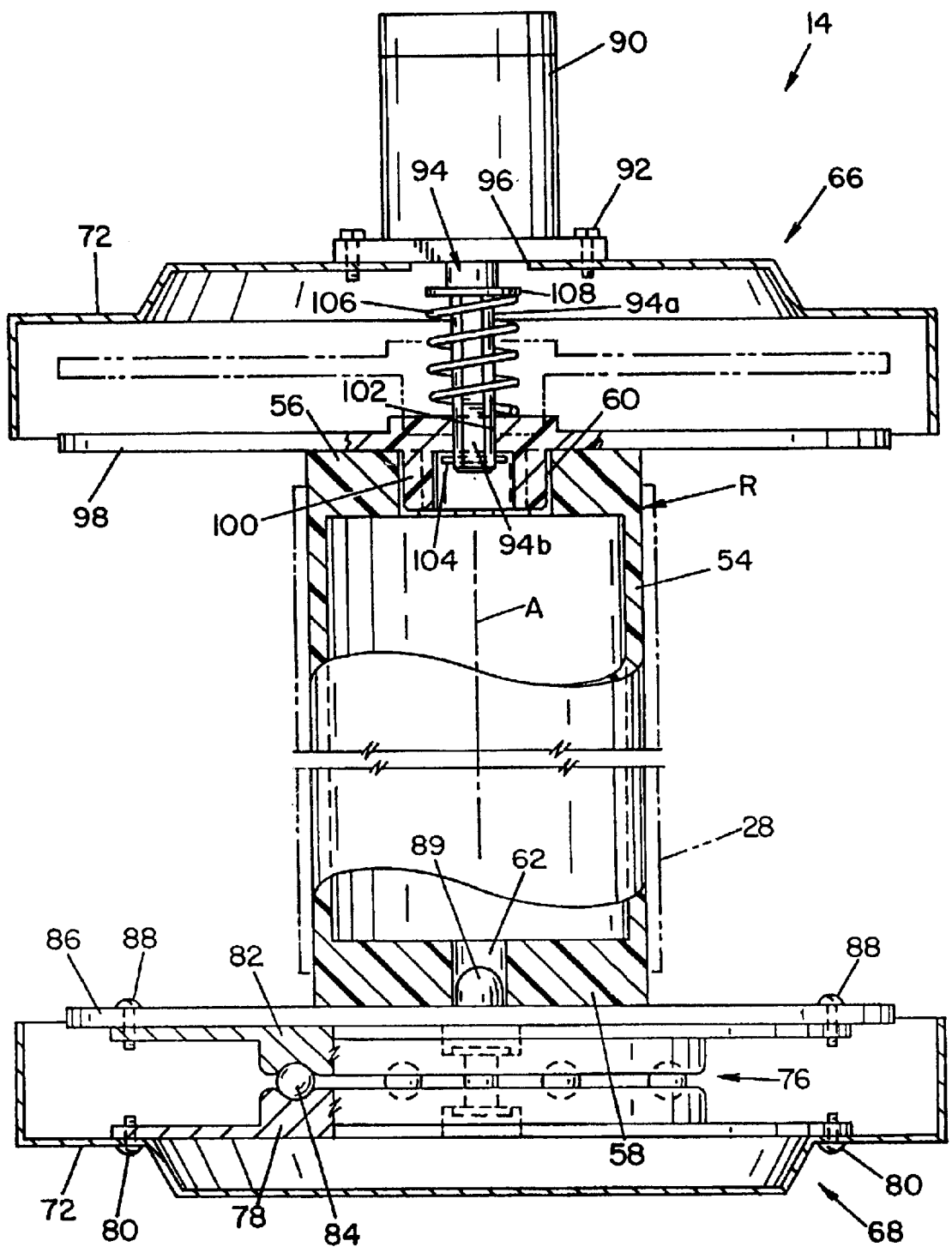
FIG. 6 is a sectional elevation view of the filter media take-up assembly taken along line 6—6 in FIG. 1.

The filter media is a continuous length of sheet material which is initially wound on a roll R to form a bulk roll of material for supply assembly 12, and take-up assembly 14 supports a roll R that is initially empty and which receives the used filter media. More particularly, the filter material is uncoiled from the supply roll and fed into the interior of the duct 20 through the adjacent duct slot 26, and the filter material extends across the interior of duct 20, while being supported by the frame assembly 16. When the filter material becomes dirty it is fed out of the duct 20 through the duct slot 26 adjacent take-up assembly 14 and is wound onto roll R thereof. Rolls R for the supply and take-up assemblies are structurally identical and, as best seen in FIGS. 5 and 6, each is comprised of an elongated cylinder 54 having an axis A, a top end wall 56 and a bottom end wall 58. The roll can be of a suitable plastic material, and top end wall 56 has a non-circular opening 60 therethrough for the purposes set forth hereinafter, and bottom end wall 58 has a circular opening 62 therethrough for rotatably supporting the roll in the supply and take-up assemblies as will become apparent hereinafter. A retaining element 64 of wire, elastic material, or the like, has its opposite ends suitably anchored to the roll and extends lengthwise along cylinder 54 to releasably secure the leading and trailing edges of filter media 28 to the roll.

Figure 2:
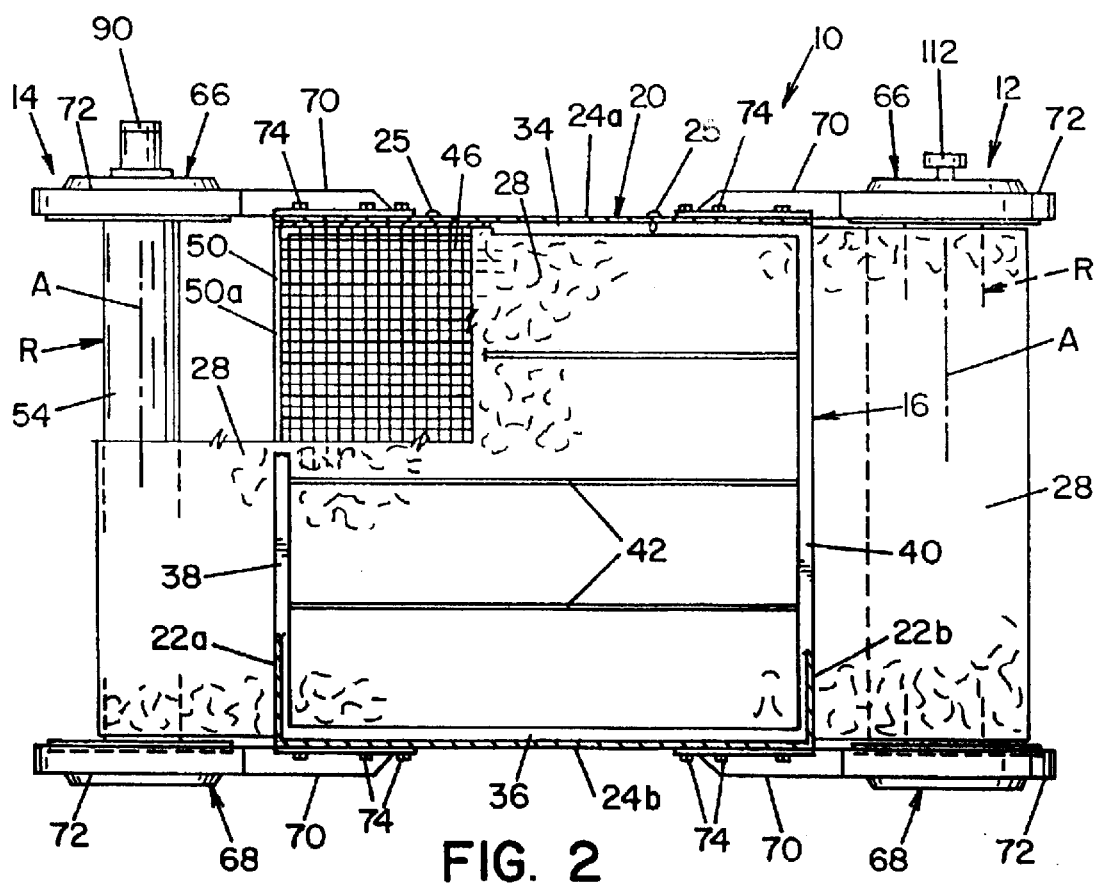
FIG. 2 is a sectional elevation view of the furnace filter system and duct taken along line 2—2 in FIG. 1.

Referring now to FIGS. 1,2 and 6, take-up assembly 14 includes upper and lower mounting and support brackets 66 and 68, respectively, for supporting take-up roll R for rotation about its axis A. Each bracket has an inner mounting end 70 and an outer roll supporting end 72. Inner ends 70 of brackets 66 and 68 are respectively mounted on the top and bottom walls 24a and 24b of duct 20, such as by sheet metal screws 74. Outer ends 72 of the brackets are spaced apart to accommodate the insertion and removal of roll R, as will become apparent hereinafter, and are aligned to support roll R for rotation about its axis A. For the latter purpose, outer end 72 of lower bracket 68 supports a thrust bearing unit 76 having a lower race 78 mounted on lower bracket portion 72, such as by fasteners 80, and having an upper race 82 supported for rotation relative to the lower race by ball bearings 84 therebetween. A roll supporting plate 86 is fastened to upper bearing race 82 for rotation therewith, such as by fasteners 88, and a post 89 extends upwardly from the center of plate 86 and has a slightly smaller diameter than that of opening 62 in the bottom wall of roll R. Support plate 86 is of a diameter larger than that of a complete roll of spent filter media wound onto roll R.

The outer portion 72 of upper support bracket 66 supports a roll drive motor 90 which is mounted on top of the bracket, such as by fasteners 92, and the motor has a drive shaft 94 extending downwardly through an opening 96 therefor in upper bracket portion 72. A roll driving plate 98 preferably of the same diameter as support plate 86 is mounted on shaft 94 for rotation therewith and for axial sliding displacement relative thereto. Plate 98 includes a centrally located drive post 100 extending downwardly therefrom and having a non-circular periphery corresponding to that of opening 60 in roll R, whereby rotation of shaft 94 imparts rotation to roll R. Further in this respect, drive shaft 94 has a semi-circular portion 94a which provides a flat 94b therealong, and plate 98 and drive post 100 are provided with a semi-circular opening 102 therethrough which allows the plate and drive post to move axially along the drive shaft away from the lower roll support plate 86 while at the same time providing for the plate and drive post to rotate with the shaft. Plate 98 is axially retained on shaft 94 by a pin 104 through the lower end of the shaft, and the plate is biased downwardly against pin 104 by a compression spring 106 captured between plate 98 and a washer 108 on the shaft and engaging a shoulder on the shaft at the upper end of semi-circular portion 94a thereof. This mounting arrangement for plate 98 and drive post 100 allows the latter to be displaced upwardly from the solid line to the broken line position thereof shown in FIG. 6 to accommodate the insertion and removal of roll R. As will be appreciated in this respect from FIG. 6 and the foregoing description, an empty roll R is inserted between lower and upper plates 86 and 98 by engaging the upper end of the roll against the underside of plate 98 and pushing the latter upwardly to the broken line position while maneuvering the roll for drive post 100 to enter opening 60 therefor in the roll. The lower end of the roll is then moved inwardly to align opening 62 in the bottom of roll R with post 89, after which the roll is released and biased to the solid line position by spring 106 thereby capturing roll R between driving plate 98 and support plate 86. When roll R is filled with spent filter media, the filled roll is displaced upwardly, thus displacing the upper plate 98 and drive post 100 upwardly to disengage post 100 from roll opening 60, whereby clearance is created so the used roll can be simply and easily lifted out of take-up assembly 14 without the need for tools. The spent roll of filter material is then discarded with minimal handling.

Figure 7:
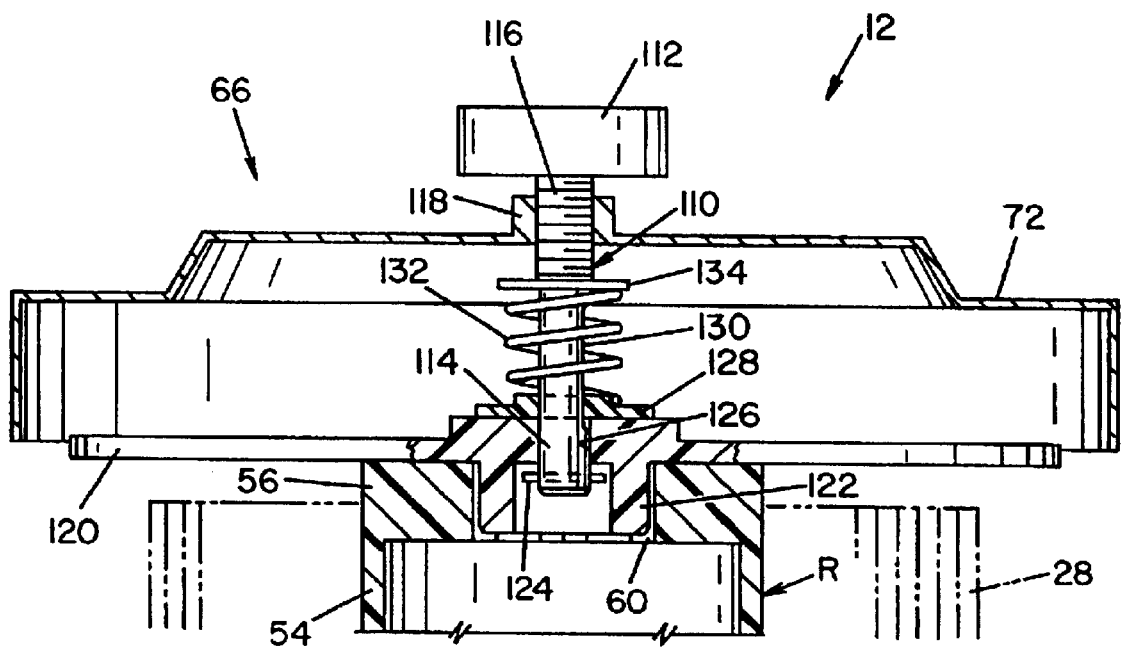
FIG. 7 is a partial sectional elevation view of the filter media supply assembly taken along line 7—7 in FIG. 1; and, FIG. 8 is a schematic diagram of the control system for a filter system in accordance with the present invention.

With reference to FIGS. 1, 2 and 7 of the drawings, supply assembly 12 is of the same general design as take-up assembly 14 and, in this respect, includes upper and lower mounting and support brackets 66 and 68, respectively, having inner ends 70 mounted on the top and bottom walls of duct 20 by sheet metal screws 74 and having outer ends 72 aligned to receive and rotatably support a roll R having a supply of unused filter media 28 wound thereon. The lower bracket 68 is identical in structure and function to lower bracket 68 of take-up assembly 14 and is therefor not shown in FIG. 7 or further described. As will be appreciated from FIG. 7, upper bracket 66 of the supply assembly is similar to the upper bracket of the take-up assembly shown in FIG. 6, except that the upper supply bracket includes a tension adjusting arrangement in place of drive motor 90. The tension adjusting arrangement is comprised of a tension adjusting bolt 110 having an adjustment knob 112 on the outer end thereof for rotating the bolt. Bolt 110 has an unthreaded shaft portion 114 at the inner end thereof and a threaded portion 116 between shaft portion 114 and knob 112. Threaded portion 116 extends through an internally threaded collar 118 on bracket portion 72, whereby rotation of bolt 110 in opposite directions relative to collar 118 displaces the bolt axially inwardly and outwardly of the mounting bracket. A supply roll drag plate 120, which is structurally similar to drive plate 98 of the take-up assembly, is supported on shaft portion 114 and includes a centrally located downwardly extending drag post 122 having a non-circular outer periphery corresponding to that of opening 60 in the upper end of roll R. Drag plate 120 functions differently than drive plate 98 and, therefore, has a different interconnection with bolt 110 than drive plate 98 has with drive shaft 94. In this respect, while plate 120 is axially retained on bolt by a retaining pin 124, shaft portion 114 is circular and opening 126 therefor in plate 120 and post 122 is circular, whereby plate 120 is free to rotate about and translate along portion 114 of the bolt. A friction plate 128 is keyed to a flat 130 on bolt portion 114 and, therefore, is rotatable with and slidable along the bolt portion. Plate 128 rests against the top of drag plate 120 and is forced against the drag plate by a compression spring 132 which is captured between plate 128 and a washer 134 on bolt 110 at the juncture between the threaded and unthreaded portions thereof. This structure allows the drag plate to be displaced axially upwardly providing the necessary clearance for the insertion of a roll R having unused media wound thereon, and for the removal of the roll when the material is depleted therefrom. Additionally, the rotation of drag plate 120 relative to the spring biased friction plate 128 in response to the unwinding of material from roll R creates a sliding friction force on the drag plate which acts to resist rotation thereof and, therefore, rotation of post 122 and roll R, whereby advancement of the filter media 28 is restrained to maintain a desired tension thereon. The frictional force varies with the amount of force applied by the spring 132, and rotation of knob 112 changes the position of washer 134 relative to plate 120 and, thus, the force applied by spring 132 against friction plate 128.

Figure 8:
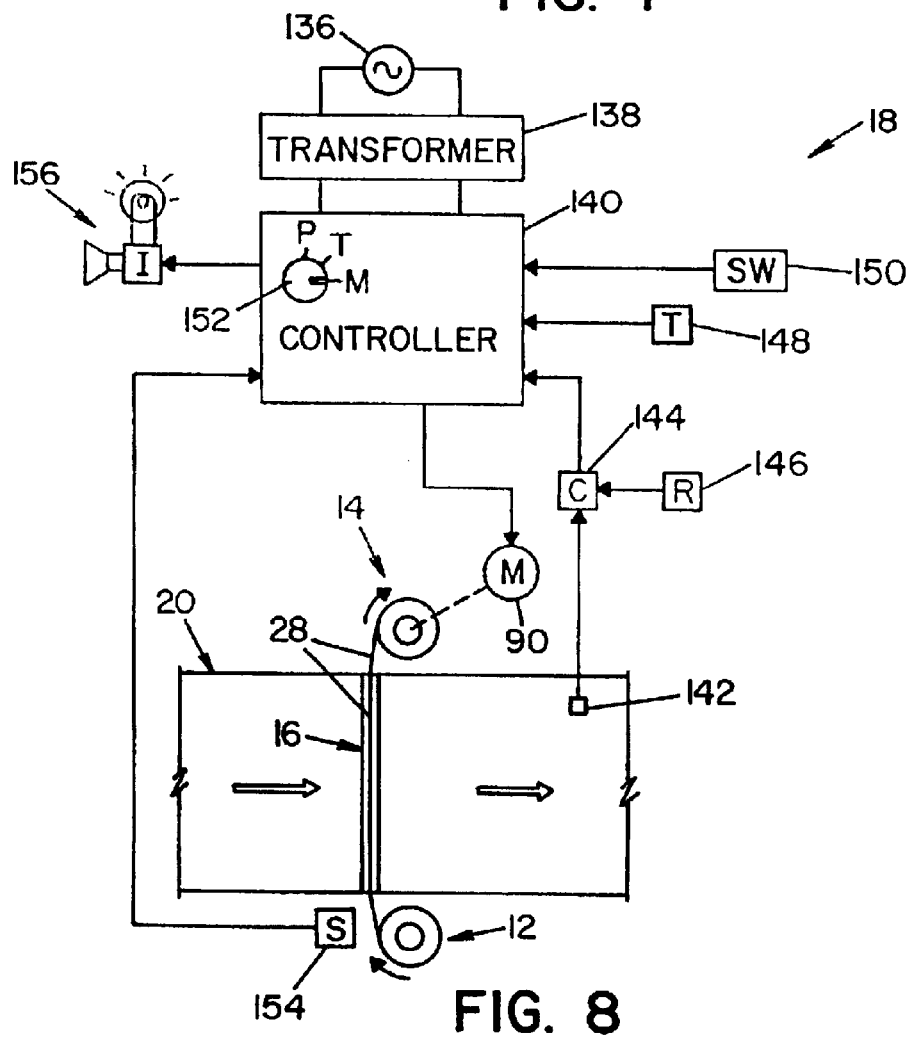

As will be appreciated from FIG. 8, control system 18 for controlling the advancement of filter media from the supply assembly 14 is operated off of a standard household power supply 136, preferably through a transformer 138. The control system includes a controller 140, such as a microprocessor, for controlling the operation of drive motor 90 to advance filter media 28 either manually, automatically in response to a predetermined time lapse, or automatically in response to the sensing of a condition indicative of the need for clean filter material in the furnace duct. Further, the control system is preferably operable to output a signal indicative of the status of the quantity of clean filter media available. For these purposes, the control system includes a pressure sensor 142 positioned in duct 20 to sense the air pressure therein at a point downstream of frame assembly 16 and thus filter media 28. As the filter media 28 becomes clogged, and therefore inefficient, the air pressure immediately downstream of the frame assembly will drop, causing pressure sensor 142 to output a voltage signal proportional to the downstream pressure. Using a comparator 144, the output signal from pressure sensor 142 is compared with a reference signal from a source 146 and, upon a predetermined difference in signals indicative of a dirty filter condition, the comparator outputs a control signal to controller 140 which responds by energizing motor 90 for a time necessary to advance a length of filter media 28 from the supply assembly to replace the dirty length in the duct. Control system 18 also includes a timer 148 and a manual switch 150. At selectable time increments, the timer 148 signals controller 140 to energize motor 90 and thereby advance the filter media 28. Switch 150 provides the ability to signal the controller to energize motor 90 on an as needed basis, providing the ability to advance the filter media 28 as use dictates. Controller 140 includes a selector switch 152 by which the system can be operated, selectively either manually, or based on time, or pressure as respectively indicated by the letters M, T and P in FIG. 8.

Control system 18 also monitors the quantity of clean filter media 28 remaining on the supply roll and issues a warning signal when the supply reaches a predetermined low level. More particularly, a supply sensor 154 monitors the level of filter media 28 remaining and communicates with the controller 140 when the predetermined low level is reached. Upon receiving the signal from the supply sensor, the controller energizes indicator 156 which then issues an audible and/or visual signal.

While considerable emphasis has been placed herein on the structures and structural interrelationships between the component parts of the embodiment disclosed, it will be appreciated that other embodiments of the invention can be made and that many changes can be made in the embodiment illustrated and described without departing from the principles of the invention. Accordingly, it is to be distinctly understood that the foregoing descriptive matter is to be interrupted merely as illustrative of the present invention and not as a limitation.

Having thus described the invention, it is so claimed:

1. A furnace filter system for installation on a furnace duct, the furnace duct having spaced apart top and bottom walls and spaced apart first and second side walls therebetween providing the duct with an internal passageway and an exterior, said furnace filter system including a supply assembly at least partially positioned exterior of said internal passageway and that holds a supply of non-spent filter media, a take-up assembly at least partially positioned exterior of said internal passageway and on a substantially opposite side of said duct from said supply assembly whereby said take-up assembly receives and stores a spent portion of said filter media, said filter media extending from said supply assembly across at least a portion of said internal passageway of said duct to said take-up assembly, a frame assembly positioned within said internal passageway of said duct to at least partially support said filter media in said internal passageway of said duct, and a control system to advance said filter media from said supply assembly to said take-up assembly, said control system including a motor to advance said filter media from said supply assembly to said take-up assembly, said supply assembly including a tension arrangement to tension said filter media during transfer from said supply assembly to said take-up assembly, said supply assembly includes an upper roll support and a lower roll support, and a first roll removably mounted therebetween, said tension arrangement at least partially positioned in said upper roll support and including an adjustable tension adjuster to at least partially tension said filter media between said supply assembly and said take-up assembly.

2. The furnace filter system as defined in claim 1, wherein said tension adjuster includes an adjustment member on said upper roll support, a compression spring between said adjustment member and said first roll to bias said first roll axially toward said lower roll support, said adjusting member being displaceable relative to said upper roll support to adjust the biasing force of said spring.

3. The furnace filter system as defined in claim 1, wherein said control system includes a supply sensor to sense a quantity of filter media in said supply assembly, and an indicator responsive to said supply sensor to indicate when said supply of filter media reaches a predetermined low level.

4. The furnace filter system as defined in claim 2, wherein said control system includes a supply sensor to sense a quantity of filter media in said supply assembly, and an indicator responsive to said supply sensor to indicate when said supply of filter media reaches a predetermined low level.

5. The furnace filter system as defined in claim 4, wherein said control system includes a controller to control said motor, and a mechanism to produce and transmit a control signal to said controller to energize said motor and advance said filter media.

6. The furnace filter system as defined in claim 1, wherein said control system includes a controller to control said motor, and a mechanism to produce and transmit a control signal to said controller to energize said motor and advance said filter media.

7. The furnace filter system as defined in claim 2, wherein said control system includes a controller to control said motor, and a mechanism to produce and transmit a control signal to said controller to energize said motor and advance said filter media.

8. The furnace filter system as defined in claim 5, wherein said mechanism to produce said control signal includes a pressure sensor.

9. The furnace filter system as defined in claim 7, wherein said mechanism to produce said control signal includes a pressure sensor.

10. The furnace filter system as defined in claim 8, wherein said pressure sensor is located at least partially in said internal passageway of said duct and downstream of said filter media with respect to the direction of flow through said duct, said mechanism to produce a control signal further including a comparator and a reference pressure signal, said pressure sensor outputting an actual pressure signal to said comparator, and said comparator outputting said control signal to said controller when the difference between said reference pressure signal and actual pressure signal reaches a predetermined level.

11. The furnace filter system as defined in claim 9, wherein said pressure sensor is located at least partially in said internal passageway of said duct and downstream of said filter media with respect to the direction of flow through said duct, said mechanism to produce a control signal further including a comparator and a reference pressure signal, said pressure sensor outputting an actual pressure signal to said comparator, and said comparator outputting said control signal to said controller when the difference between said reference pressure signal and actual pressure signal reaches a predetermined level.

12. The furnace filter system as defined in claim 10, wherein said frame assembly includes front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top, bottom and side walls.

13. The furnace filter system as defined in claim 4, wherein said frame assembly includes front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top, bottom and side walls.

14. A furnace filter system for installation on a furnace duct, the furnace duct having spaced apart top and bottom walls and spaced apart first and second side walls therebetween providing the duct with an internal passageway and an exterior, said furnace filter system including a supply assembly at least partially positioned exterior of said internal passageway and that holds a supply of non-spent filter media, a take-up assembly at least partially positioned exterior of said internal passageway and on a substantially opposite side of said duct from said supply assembly whereby said take-up assembly receives and stores a spent portion of said filter media, said filter media extending from said supply assembly across at least a portion of said internal passageway of said duct to said take-up assembly, a frame assembly positioned within said internal passageway of said duct to at least partially support said filter media in said internal passageway of said duct, and a control system to advance said filter media from said supply assembly to said take-up assembly, said control system including a motor to advance said filter media from said supply assembly to said take-up assembly, said supply assembly including a tension arrangement to tension said filter media during transfer from said supply assembly to said take-up assembly, said frame assembly including front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top, bottom and side walls, said front support mechanism including a plurality of guide wires extending between said pair of side members and said rear support mechanism includes a screen extending between said top and bottom members and between said side members.

15. The furnace filter system as defined in claim 13, wherein said front support mechanism includes a plurality of guide wires extending between said pair of side members and said rear support mechanism includes a screen extending between said top and bottom members and between said side members.

16. The furnace filter system as defined in claim 12, wherein said take-up assembly includes an upper roll support and a lower roll support, and a second roll being removably mounted therebetween.

17. The furnace filter system as defined in claim 1, wherein said take-up assembly includes an upper roll support and a lower roll support, and a second roll being removably mounted therebetween.

18. The furnace filter system as defined in claim 15, wherein said take-up assembly includes an upper roll support and a lower roll support, and a second roll being removably mounted therebetween.

19. The furnace filter system as defined in claim 11, wherein said take-up assembly includes an upper roll support and a lower roll support, and a second roll being removably mounted therebetween.

20. A furnace filter kit for installation on an existing furnace duct having an interior passageway and an exterior and first and second side walls, said filter kit including a supply assembly that is at least partially positioned on the exterior of said furnace duct to hold a supply of non-spent filter media, a take-up assembly that is at least partially positioned on the exterior of said duct subsisting on the other side of the duct from said supply assembly, whereby said take-up assembly receives and stores a spent portion of said filter media, a frame assembly to be at least partially positioned in said interior passageway of said duct to at least partially support said filter media across said interior passageway of said duct between the supply assembly and take-up assembly, and a control unit to control displacement of said filter media from said supply assembly to said take-up assembly, said control unit including a motor to advance said filter media from said supply assembly to said take-up assembly, said supply assembly including a tension arrangement to tension said filter media during transfer from said supply assembly to said take-up assembly, said supply assembly includes an upper roll support and a lower roll support and a supply roll removably mounted therebetween, said take-up assembly includes an upper roll support and a lower take-up roll support and a take-up roll removably mounted therebetween, said tension arrangement at least partially positioned in said upper roll support and including an adjustable tension adjuster to at least partially tension said filter media between said supply assembly and said take-up assembly.

21. The filter kit as defined in claim 20, wherein said tension adjuster includes an adjustment member on said upper roll support, a compression spring between said adjustment member and said first roll to bias said first roll axially toward said lower roll support, said adjusting member being displaceable relative to said upper roll support to adjust the biasing force of said spring.

22. The filter kit as defined in claim 20, wherein said supply roll and said take-up roll are substantially structurally identical.

23. The filter kit as defined in claim 21, wherein said supply roll and said take-up roll are substantially structurally identical.

24. The filter kit as defined in claim 22, wherein said control unit includes a controller to control said motor and a sensor to signal said controller to energize, said sensor including a supply sensor to sense a quantity of filter media in said supply assembly, and an indicator responsive to said supply sensor to indicate when said supply of filter media reaches a predetermined low level.

25. The filter kit as defined in claim 23 wherein said control unit includes a controller to control said motor and a sensor to signal said controller to energize, said sensor including a supply sensor to sense a quantity of filter media in said supply assembly, and an indicator responsive to said supply sensor to indicate when said supply of filter media reaches a predetermined low level.

26. The filter kit as defined in claim 24, wherein said control unit includes a controller to control said motor and a sensor to signal said controller to energize, said sensor including a pressure sensor.

27. The filter kit as defined in claim 23, wherein said control unit includes a controller to control said motor and a sensor to signal said controller to energize, said sensor including a pressure sensor.

28. The filter kit as defined in claim 26, wherein said frame assembly includes front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top, bottom, and side walls.

29. The filter kit as defined in claim 25, wherein said frame assembly includes front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top, bottom, and side walls.

30. The filter kit as defined in claim 27, wherein said frame assembly includes front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top, bottom, and side walls.

31. A furnace filter kit for installation on an existing furnace duct having an interior passageway and an exterior and first and second side walls, said filter kit including a supply assembly that is at least partially positioned on the exterior of said furnace duct to hold a supply of non-spent filter media, a take-up assembly that is at least partially positioned on the exterior of said duct subsisting on the other side of the duct from said supply assembly, whereby said take-up assembly receives and stores a spent portion of said filter media, a frame assembly to be at least partially positioned in said interior passageway of said duct to at least partially support said filter media across said interior passageway of said duct between the supply assembly and take-up assembly, and a control unit to control displacement of said filter media from said supply assembly to said take-up assembly, said control unit including a motor to advance said filter media from said supply assembly to said take-up assembly, said supply assembly including a tension arrangement to tension said filter media during transfer from said supply assembly to said take-up assembly, said frame assembly includes front and rear sides, a top member, a bottom member, and a pair of spaced apart side members between said front and rear sides, said filter media at least partially supported between said front and rear sides, each of said side members includes a slot extending therealong between said front and rear sides of the frame assembly, each of said slots having a pair of edges terminating within said frame assembly to support said filter media during movement through the slots, and said frame assembly including a front and rear support mechanism positioned adjacent said front and rear sides to at least partially support said filter media between said top bottom, and side walls, said front side includes a plurality of guide wires extending between said side members and said rear side includes a support screen extending between said top and bottom members and between said side members.

32. The filter kit as defined in claim 29, wherein said front side includes a plurality of guide wires extending between said side members and said rear side includes a support screen extending between said top and bottom members and between said side members.

33. A disposable filter cartridge to support a roll of disposable, air-permeable filter material for use in a non-disposable furnace filter system, said filter cartridge comprising an elongated cylindrical body having an axis and a length of filter material wound on said cylindrical body, axially opposite ends and an outer surface between said opposite ends, an end wall at each of said opposite ends and an axially outer surface intersecting said outer surface at the corresponding end of said cylindrical body, a filter material retaining element to releasably secure said filter material to said cylindrical body, said retaining element extending along said radially outer surface between said opposite ends of said cylindrical body for radial outward displacement of said filter material relative to said cylindrical body, and a non-circular opening in one of said end walls coaxial with said axis, said non-circular opening only partially extending along said axis of said cylindrical body, said non-circular opening adapted to receive a movement mechanism that rotates said cylindrical body about said axis.

34. The filter cartridge as defined in claim 33, wherein said non-circular opening is substantially star-shaped.

35. The filter cartridge as defined in claim 33, wherein said body includes a second opening at said other end from said nm-circular opening, said second opening and said non-circular opening substantially coaxial with said axis.

36. The filter cartridge as defined in claim 34, wherein said body includes a second opening at said other end from said non-circular opening, said second opening and said non-circular opening substantially coaxial with said axis.

37. The filter cartridge as defined in claim 33, wherein said filter material has an inner end releasably retained on said cylinder by said retaining element, said retaining element at least partially secured to said cylindrical body.

38. The filter cartridge as defined in claim 36, wherein said filter material has an inner end releasably retained on said cylinder by said retaining element, said retaining element at least partially secured to said cylindrical body.

39. The filter cartridge as defined in claim 33, wherein said filter material is non-reusable.

40. The filter cartridge as defined in claim 38, wherein said filter material is non-reusable.

* * * * *